United States Patent [19]
Thatcher

[11] 3,910,480
[45] Oct. 7, 1975

[54] CIRCUMFERENTIAL TRACK AND BAND ASSEMBLY WITH QUICK RELEASE

[75] Inventor: Russell S. Thatcher, Alvin, Tex.

[73] Assignee: Central Welding Supply Co., S. Houston, Tex.

[22] Filed: May 6, 1974

[21] Appl. No.: 467,584

[52] U.S. Cl. .................. 228/45; 228/29; 219/60 A; 266/23 N; 269/1; 269/130
[51] Int. Cl.² ..................... B23K 37/02; B23K 5/08
[58] Field of Search .. 228/29, 45; 219/60 A, 125 R; 266/23 N, 23 K; 82/4 C; 30/96, 97, 98; 269/1, 130

[56] References Cited
UNITED STATES PATENTS

| | | | |
|---|---|---|---|
| 2,013,630 | 9/1935 | Goldsborough | 219/60 A |
| 2,705,629 | 4/1955 | Miller | 266/23 N |
| 3,256,418 | 6/1966 | Bauer et al. | 219/125 R |
| 3,380,148 | 4/1968 | Nelson et al. | 228/29 X |
| 3,688,615 | 9/1972 | Protze et al. | 82/4 C |
| 3,702,913 | 11/1972 | Kazluaskas et al. | 219/60 A |

Primary Examiner—Al Lawrence Smith
Assistant Examiner—K. J. Ramsey
Attorney, Agent, or Firm—Arnold, White & Durkee

[57] ABSTRACT

A rigid track assembly is adapted for mounting on the exterior of a pipe or similar workpiece for receiving mechanical apparatus such as a welding head and supporting that apparatus for controlled movement with respect to the circumference of the workpiece. A combination of roller devices and quick release latching means facilitates rapid positioning of the track assembly on the workpiece as well as easy removal following completion of welding or other operations.

9 Claims, 10 Drawing Figures

CIRCUMFERENTIAL TRACK AND BAND ASSEMBLY WITH QUICK RELEASE

BACKGROUND OF THE INVENTION

This invention generally relates to means for positioning and supporting mechanical apparatus about the exterior circumferential surface of a cylindrical or approximately cylindrical pipe or other workpiece, and, more particularly, to an annular track assembly for positioning and supporting apparatus for automatic or semi-automatic welding, grinding, or cutting of pipe and the like. For example, in butt welding of medium to large diameter pipe, it is desirable to provide means for receiving and guiding a carriage which supports and guides a welding head along the pipe joint. Important considerations for such apparatus are that it should be reasonably easy to handle, require a minimum of time for positioning and securing about the exterior of the pipe, and of sufficient strength to support and guide the carriage bearing the welding head and other desired equipment. Additionally, such apparatus should be suitably rugged for long service life under hard use in hostile environments.

Accordingly, it is desirable to provide a rigid, sectional hinged band forming a track, which assembly may be quickly and accurately positioned and clamped about the exterior of a pipe for receiving welding or cutting apparatus and for supporting and guiding that apparatus for operations upon said pipe. It is further desired to provide the track assembly with a quick-locking and quick-release latch assembly which permits the ready removal of the band and track assembly from said pipe. Such an assembly further should be movable about the circumference of the pipe and axially along the pipe to optimally position said track assembly both for tightening the band and for receiving the carriage holding the desired tool.

SUMMARY OF THE INVENTION

In accordance with the present invention, a hinged band with a quick-release latch assembly is provided for encircling a medium to large diameter pipe for receiving and supporting mechanical apparatus utilized to perform various mechanical operations upon said pipe. The hinged band is comprised of several arcuate sections, of substantially rigid material, which form an annular ring when joined. The rigid portion of the hinged band is customarily referred to as a track for receiving the mechanical apparatus above referred to. The invention employs the hinged band, which, having one or more hinge points, is readily placed about the exterior surface of said pipe and the latch assembly loosely engaged. In placing the band assembly about the pipe, the operator is often required to adjust the band radially about the pipe or move the band closer to or away from the pipe end. Accordingly, this invention employs a series of rollers affixed to the internal surface of the band for allowing the band to be arcuately positioned about the pipe, and for moving the band axially along the pipe prior to tightening the band about the pipe.

After positioning of the hinged band, tightening of the latch results in frictional engagement of the latch assembly with the pipe to prevent further relative movement between said band and said pipe.

When the mechanical operation upon the pipe is completed, the track assembly may be removed from the exterior of the pipe and moved to the next work location. Therefore, one additional feature of this invention is to provide a quick-release mechanism for quickly securing and removing the track assembly from the exterior of the pipe.

DESCRIPTION OF THE PREFERRED EMBODIMENT

Figure 1:
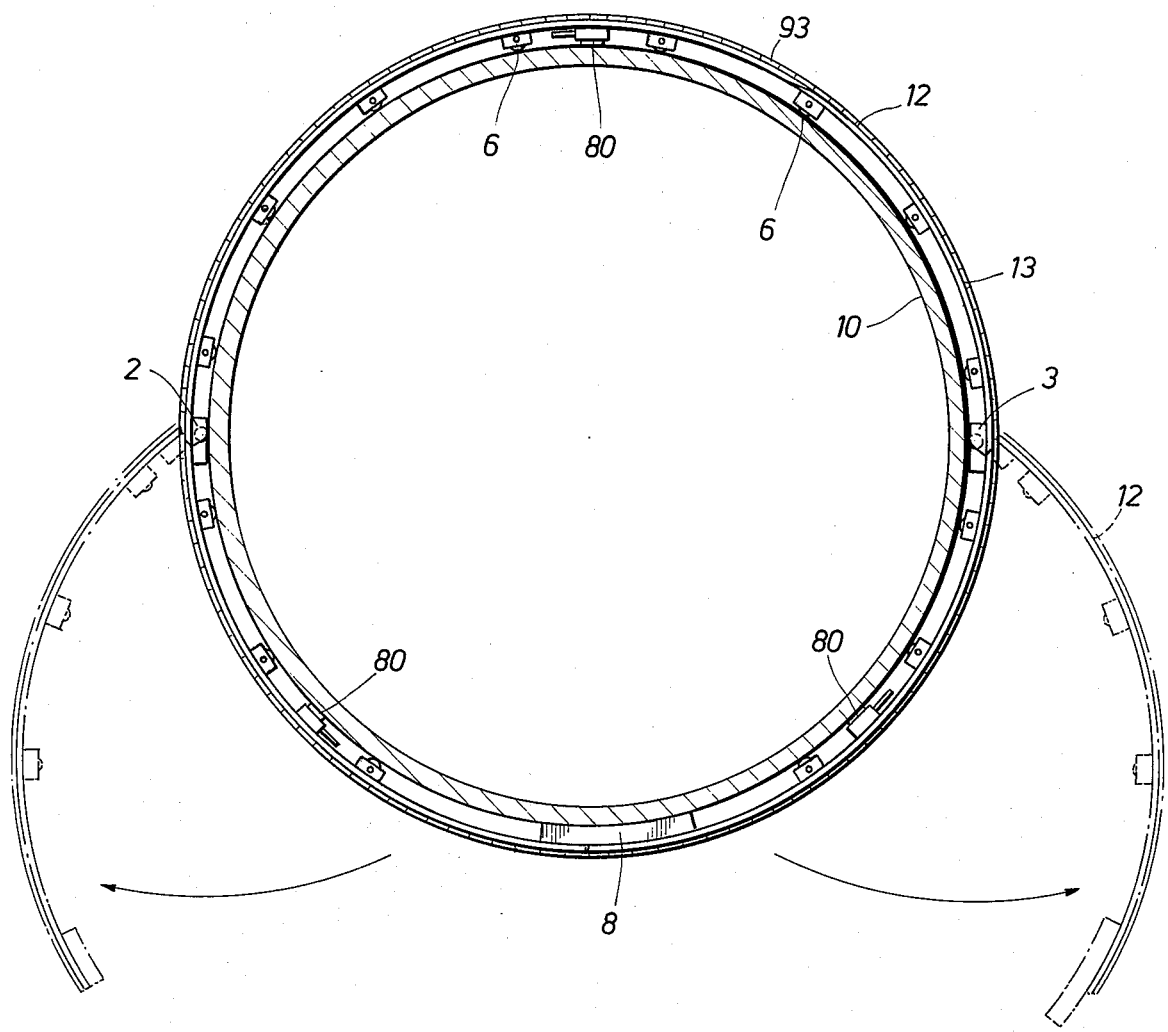
FIG. 1 is an end view of the pipe with the track assembly about the external surface thereof, showing in phantom the band in its open position.

Referring to FIG. 1, the invention employs a metal band 12 circumferentially surrounding a pipe 10 for receiving and supporting mechanical apparatus which is to perform certain operations upon the surface of the pipe. The invention comprises the hinged band 12, rollers 6 and 80, hinges 2 and 3, band latch assembly 8, and associated apparatus. The band 12 in its closed and latched position forms an annular substantially rigid track 13 about the exterior of the pipe 10.

In FIG. 1, the band 12 is shown in its latched position about a cylindrical pipe 10. The band latch assembly, illustrated generally at 8, employs a novel quick-release latch with mating serrated surfaces for permitting expeditious assembly and removal of the band 12 from the pipe 10.

Figure 5:
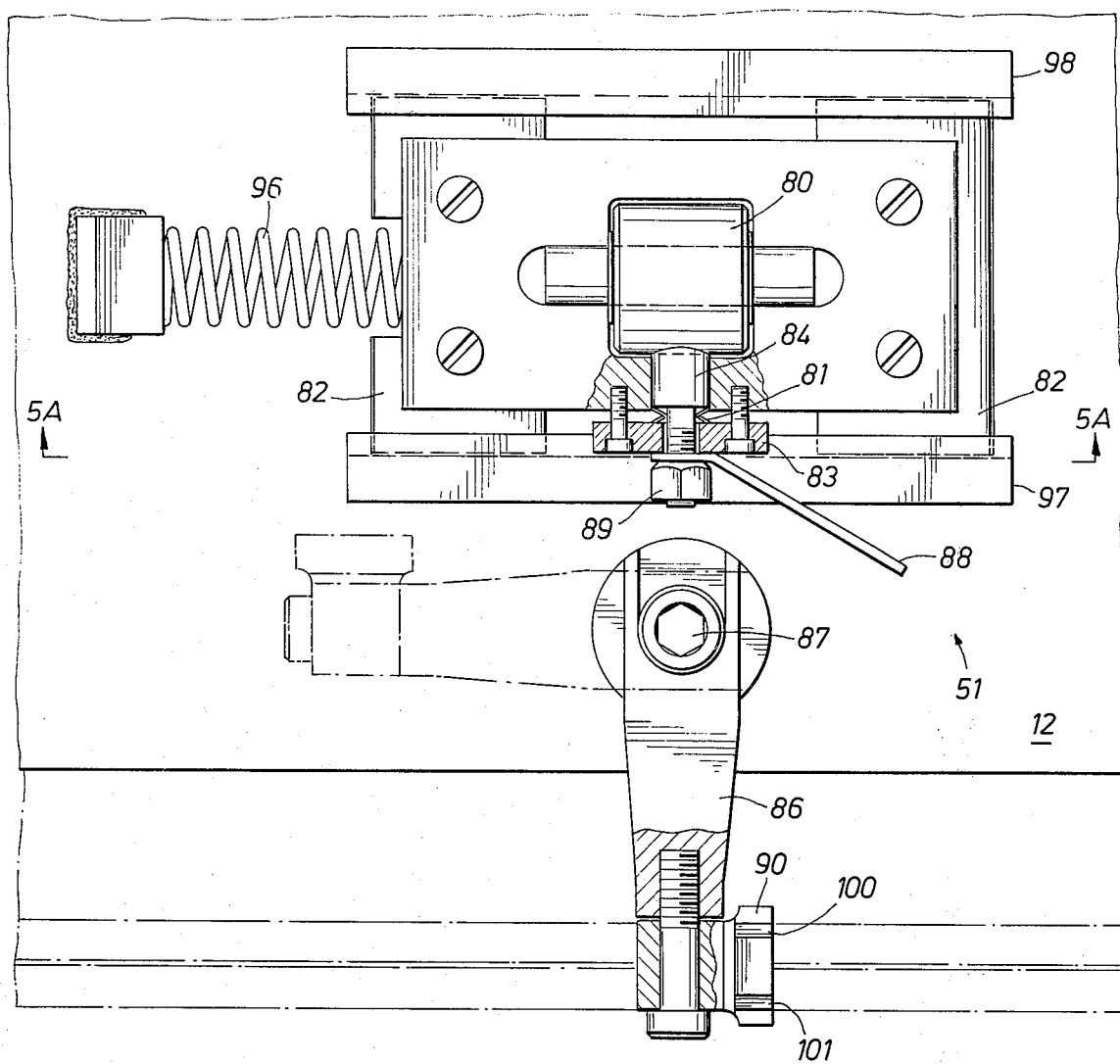
FIGS. 5 and 5A are views of the positioning roller assembly for axial positioning of the track assembly along the pipe.
Figure 5A:
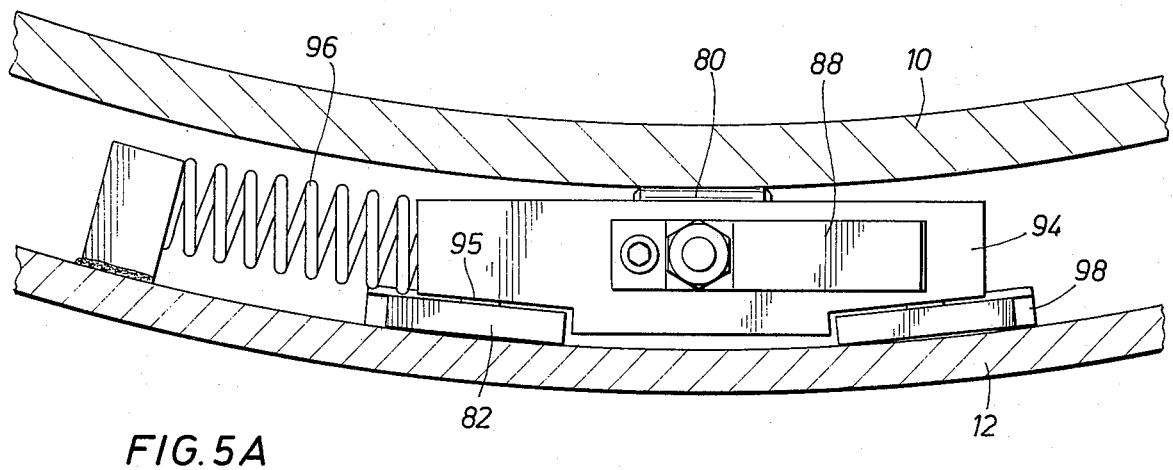

Viewing FIG. 5A, when assembling the band 12 about pipe 10, roller 80 contacts the outer surface of pipe 10. Roller 80 forms a part of the positioning roller assembly of FIG. 5, which is comprised of roller 80, roller brake 84, slip mountings 82 and band-track position gauge 86. The roller brake 84 is biased into firm engagement with roller 80 by a spring 81. Spring 81 is compressed by the assembly of brake spring holder 83, brake release arm 88 and nut 89. In its assembled condition, the assembly maintains compression upon spring 81, thereby resulting in spring 81 biasing brake shoe 84 into contact with roller 80. Release of the brake shoe from contact with roller 80 is accomplished through brake release arm 88. Thus, when desired to release the axial roller 80 for movement of the band 12, one need only exert a small force on brake release arm 88 and position the band 12 to its desired location. Roller 80 is affixed to the band 12 such that rollers 80, having their rolling axis perpendicular to the longitudinal axis of pipe 10, contact pipe 10 prior to rollers 6, permitting axial movement of band 12. After initial axial positioning of the band 12 is complete, the latch assembly 8 is tightened a small amount, thereby bringing rollers 6 (FIG. 1) into contact with the exterior surface of pipe 10. Arcuate adjustment of the band 12 is accomplished with both sets of rollers 6 and 80 contacting the surface of the pipe, allowing rollers 80 to exert a small amount of drag on the outer surface of pipe 10. However, when tightening the band 12 after final positioning, such movement between rollers 80 and the outer surface of pipe 10 is undesirable. Thus, there is provided a slide mechanism for permitting relative movement between the interior surface of band 12 and the roller assembly. In FIG. 5A, one observes the slipper pads 82 affixed to the axial roller frame 94. The surface of each of the slipper pads 82 adjacent the interior of band 12 is coated with a suitable substance such as teflon for permitting sliding movement between slipper pads 82 and band 12. Additionally, the slipper pads 82 are resiliently mounted with respect to roller frame 94 to urge firm contact between roller 80 and pipe 10. The resilient mounting employed of pads 82 comprises a spring 99 fixed to axial roller frame 94 which biases pad 82 into firm contact with the interior surface of the band 12, via shear pin 95.

It will be noted in FIG. 5A that roller frame 94 is affixed to band 12 through a shear pin coupling 95, permitting the roller 80 to move relative to band 12 and to remain fixed relative to pipe 10 as the band 12 is tightened about pipe 10.

A band-track positioning gauge 86 provides a ready referencing tool for positioning the track at a predetermined distance from the end of pipe 10. The gauge 86 is pivotally mounted such that in the parked or closed position it will be clear of any apparatus moving along track 13. A centering scale 90 is premarked with gauge marks to facilitate rapid positioning of the band 12 which will ultimately result in the tool mounted on band 12 being correctly positioned for performing its mechanical operation upon the end of pipe 10.

Viewing FIG. 1, the plurality of rollers 6 spaced arcuately about the interior surface of the band 12 serve the dual function of permitting adjustments of the track assembly about the circumference of the pipe 10 after engagement, but prior to tightening of the latch assembly 8, as well as spacing the track assembly a predetermined distance away from the surface of the pipe 10. This novel dual function of the rollers 6, permits the band 12 to be loosely positioned upon the pipe 10, and after axial adjustment, arcuately moved to an optimum position for receiving mechanical apparatus, and tightened to prevent further movement of the band 12 relative to the pipe 10.

Figure 2:
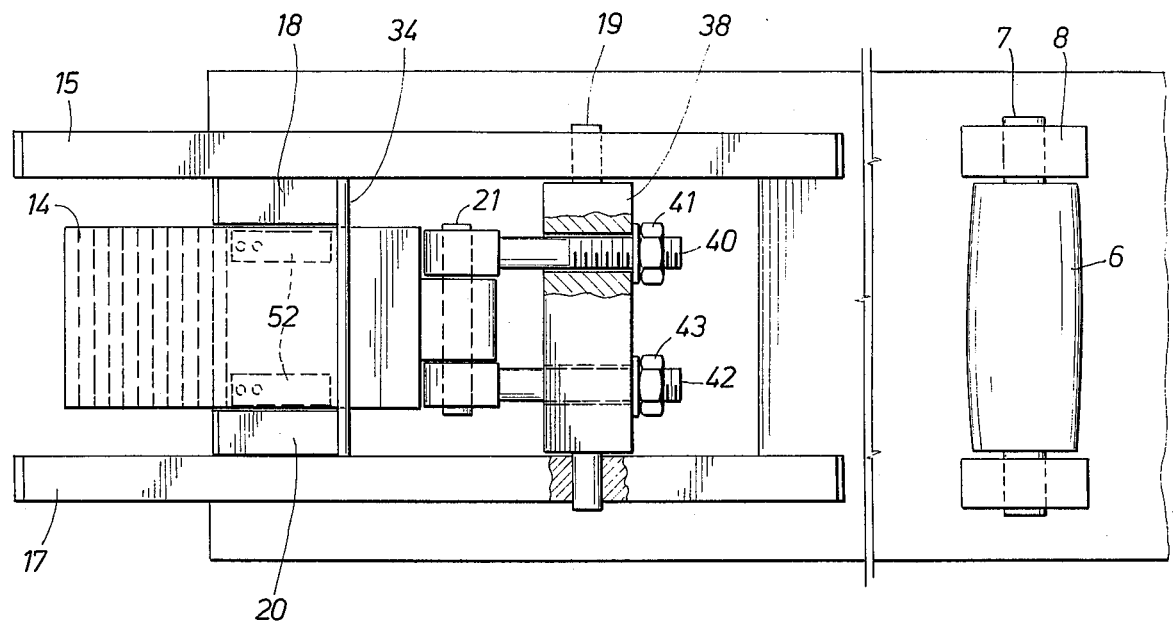
FIG. 2 is an internal view of a portion of the interior surface of the band assembly. The longer end of the band latch assembly and one roller are shown.

The roller 6 is illustrated in FIG. 2, wherein one embodiment of the band assembly employs a tapered roller 6, mounted upon bearing pin 7 extending the full length of roller 6 and roller support blocks 8.

Additionally, the diametral axis of the track assembly will not always align itself in perpendicular relation to the longitudinal axis of the pipe 10 when first placed about the pipe. The rollers 6 being tapered permit arcuate adjustment in this skewed position, the bearings 6 maintaining rolling contact between the bearings 6 and the interior surface of band 12 in any misaligned position.

Figure 6:
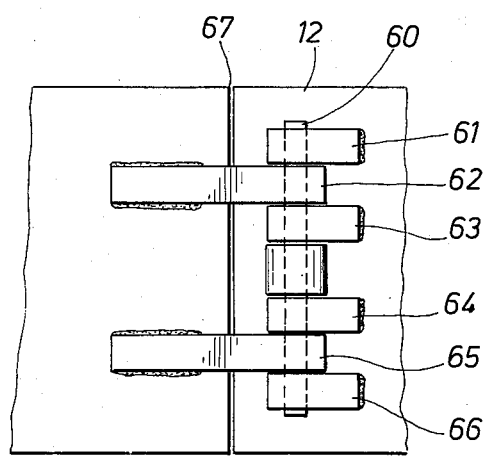
FIG. 6 is a view of the hinge assembly connecting the band at its hinge points.

Referring to FIG. 6, the band hinge 2 is observed. Band 12 is separated at joint 67 and another position opposite joint 67 (not shown) for permitting ease of assembly and diassembly of the band 12 with respect to pipe 10. The hinge is of standard configuration with hinge shaft 60 joining hinge elements 61–66.

Figure 2A:
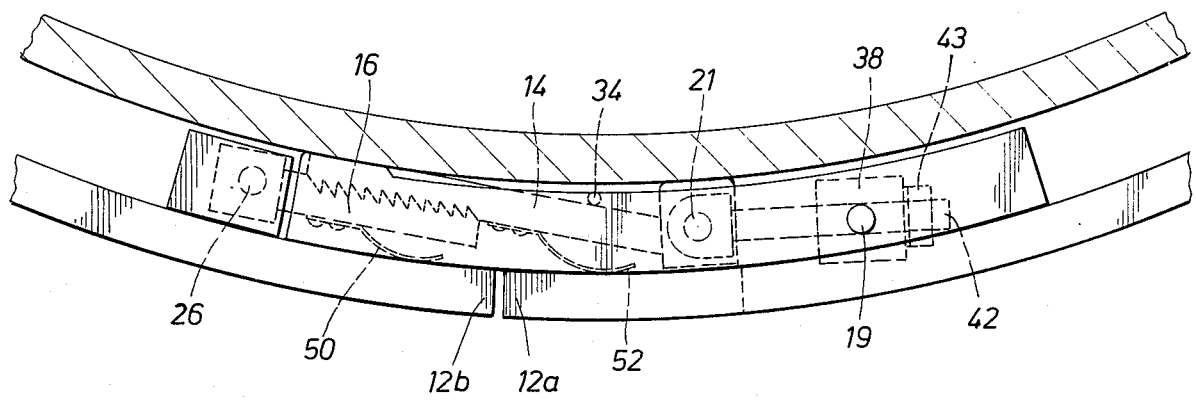
FIG. 2A is a cross-sectional view of the latch assembly in the engaged position.
Figure 2B:
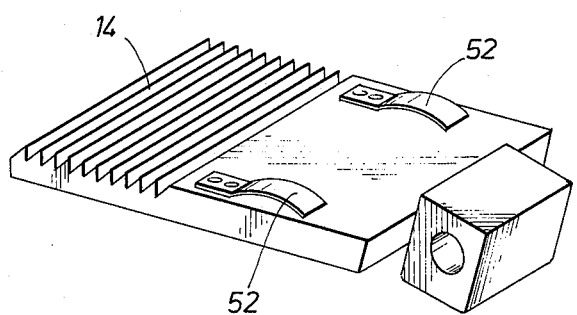
FIG. 2B is a perspective view of one of the serrated latch members shown in FIG. 2.
Figure 3:
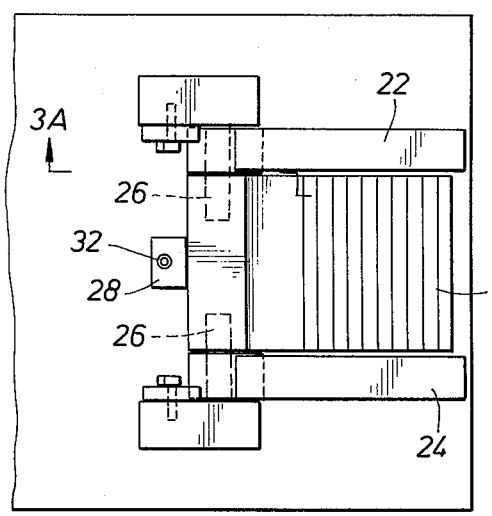
FIG. 3 is a portion of the internal surface of the track assembly with the shorter end of the latch assembly illustrated.
Figure 3A:
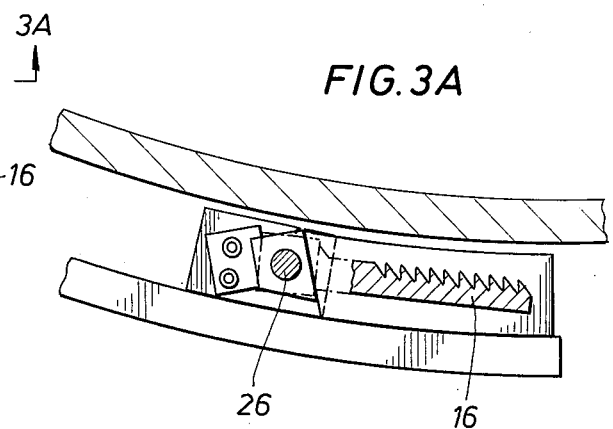
FIG. 3A is a side view taken along line 3A—3A of the serrated latch member shown in FIG. 3.

The operation of the band latch assembly may be understood with reference to FIGS. 2 and 3. The band latch assembly 8 (FIG. 1) comprises mating serrated latch halves 14 and 16, leaf springs 50 and 52 (FIG. 2A), guide bars 15, 17, 22 and 24, and other spacers, pins and bearings.

Referring to FIG. 2, the serrated latch half member 14 is pivotally mounted about pin 21, with retainer bar 34 restricting full rotation of member 14 about pin 21. Pin 21 joins latch member 14 and bolts 40, 42 which pass through draw bar 38. The draw bar 38 is rotatably mounted about pin 19 which serves the dual function of anchoring the draw bar assembly to the band 12, while permitting movement of the latch member 14 perpendicular to the surfaces of band 12 and pipe 10. This movement is desirable, in that latch member 14 is allowed to move toward the exterior surface of the pipe 10 when bringing the latch members 14 and 16 into proximity for joinder. As will be discussed hereinafter, leaf spring 52 urges latch member 14 into contact with pipe 10 so that the end of latch member 14 will not interfere with latch member 16 when closing.

The guide bars 15 and 17 serve the function of providing an index for mating the two ends of the track assembly when closing the track assembly about the pipe 10. Further, guide bars 15 and 17 together with guide bars 22 and 24 provide the surface for frictional engagment of the band and the exterior surface of the pipe 10 upon tightening of the latch assembly 8 (FIG. 1).

Referring to FIG. 3, latch member 16 has face serrations similarly cut to those of latch member 14, to provide mating surfaces with the serrations of member 14 (FIG. 2). The latch member 16, being rotatably mounted about pins 26, is restrained from excessive rotational movement by tab 28. There is provision for a set screw 32 in tab 28 such that decreasing or increasing the travel of set screw 32 through tab 28 results in permitting respectively more or less rotational movement of member 16 about pin 26.

When ready for joining the ends of band 12, it is only necessary to bring the band ends 12a and 12b (FIG. 2A) into proximity where guide bars 15 and 17 (FIG. 2) are positioned adjacent to and outside of guide bars 22 and 24 (FIG. 3) for guiding latch members 14 and 16 into position for engagement. The alignment of the respective guide bars is assured by the inherent rigidity of the band. Upon bringing latch members 14 and 16 together, the leaf springs 50 (FIG. 2A) urge member 16 into positive engagement with member 14 and assures that the serrations will be in full engagement for tightening.

Figure 4:
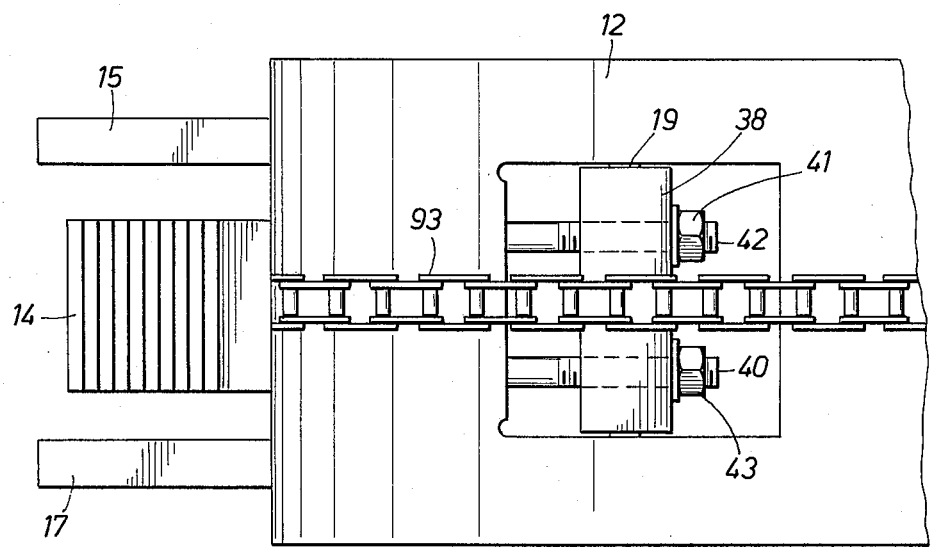
FIG. 4 is a view of a portion of the exterior surface of the track assembly, being a rear view of that portion of the track assembly depicted in FIG. 2, and showing access to the latch assembly for tightening.

Tightening of the band 12 is accomplished through bolts 40 and 42 in conjunction with draw bar 38. Access to the bolts may be seen in FIG. 4, where a tightening force being applied to bolts 40 and 42 causes latch member 14 to be moved in the opposite direction from member 14, thus bringing band ends 12a and 12b together.

Viewing FIG. 2A, leaf springs 52, fixed to latch member 14 by rivets or the like, bear upon the interior surface of band 12 forcing latch member 14 into contact with the exterior surface of pipe 10. Leaf springs 50, similarly fixed to latch member 16, bear upon the internal surface of band 12 causing a force to be exerted on latch member 16 in the same direction as that acting upon member 14 resulting in a positive closing force to fully seat the serrations of latch member 16 with those of latch member 14.

Further in-place stability of latch member 14 is provided by guide blocks 18 and 20 (FIG. 2). These blocks provide a surface against which latch member 14 may bear, resulting in greater longitudinal stability of member 14.

With the band latch assembly in loose engagement, guide bars 15, 17 (FIG. 2), 22 and 24 (FIG. 3) are not in tight frictional contact with the surface of pipe 10. Such loose engagement permits the track assembly to be rolled axially on the pipe 10 to bring the band 12 into a desired position with respect to the pipe joint or end.

After positioning of the band in the desired position relative to the pipe 10, a tightening force is imparted to the band latch assembly through draw bolts 40, 42 (FIG. 2) for bringing the guide bars 15, 17, 22 and 24 into frictional engagement with the surface of the pipe 10. Tensioning the band latch assembly 8 (FIG. 1) then brings guide bars 15, 17, 22 and 24 into direct frictional engagement with the pipe 10, preventing any further relative movement between the band 12 and pipe 10.

With the band 12 in position about pipe 10, a desired mechanical apparatus may be positioned thereon for performing work upon the pipe. This may be a cutting or welding tool, which is customarily mounted, together with cooperating drive mechanism, on a carriage which travels along the exterior of band 12. Viewing FIG. 4, a chain 93 is provided for receiving a drive mechanism such as a sprocket wheel associated with the carriage assembly. The chain 93 is provided with conventional adjusting and tightening features to maintain tension in the chain.

To one skilled in the art, it will readily be obvious from a consideration of the mechanical joining of latch members 14 and 16 that a hydraulic power source may be employed as the motive force for tensioning the band latch assembly 8 (FIG. 1). Such a power source could be either external or self-contained with a small double-acting hand operated pump to provide hydraulic pressure for tightening the band latch assembly 8.

Band latch assembly 8 (FIG. 1) may be readily detensioned to facilitate removal of the band from about pipe 10. Referring to FIG. 2, in the configuration utilizing a draw bar, it is only necessary to release the tension on the bolts 40, 42 by removing nuts 41, 43. This releases the tension holding mating surfaces of latch member 14 and 16 in justaposition. With no tension being applied to the joinder of the latch assembly, it is only necessary to apply a sharp inward force to the band 12 in the vicinity of latch member 14. This sharp force causes the latch members to separate, thereby permitting rapid removal of the track assembly from the pipe 10 for transport to the next work station.

The foregoing description is considered as illustrative only of the principles of the invention. Since numerous changes and modifications will be readily apparent to one skilled in the art, the invention is not limited to the exact form described. Rather all modifications and variations are intended to fall within the scope of the invention as set forth in the claims.

I claim:

1. A track assembly adapted to support welding apparatus for operation about the circumference of a pipe, comprising:

a plurality of rigid, arcuate plate sections pivotally connected to one another to define a band having first and second ends;

latch means including latch elements mounted proximate each of said ends for engagement with one another to secure said band circumferentially about a pipe, said latch means including means for initially engaging said latch elements and means for moving at least one of said latch elements with respect to said band for tightening said band on the pipe;

first roller means mounted on said band for rolling engagement with the pipe when said band is disposed circumferentially about the pipe, said first roller means being mounted for axial movement of said band with respect to the pipe; and second roller means mounted on said band for rolling engagement with the pipe when said band is disposed circumferentially about the pipe, said second roller means being mounted for arcuate movement of said band with respect to the pipe and to support said band a predetermined uniform distance from the pipe when said band is tightened on the pipe.

2. A track assembly as recited in claim 1 wherein said latch means includes:

a first serrated latch element pivotally mounted on said band proximate said first end;

a second serrated latch element pivotally mounted on said band proximate said second end for engaging said first latch member when said band is disposed around the pipe;

means biasing at least one of said latch elements toward a predetermined position relative to said band for latching engagement when said band is disposed about the pipe; and means for providing frictional engagement between said band and the pipe when said band is tightened on the pipe.

3. A track assembly as recited in claim 1 wherein said first roller means are resiliently biased toward the pipe for supporting said band for axial movement with respect to the pipe.

4. A track assembly as recited in claim 3 wherein said first roller means are mounted for movement radially outward as said band is tightened on the pipe.

5. A track assembly as recited in claim 1 including brake means mounted on said band proximate each of said first roller means and including a brake element biased against each of said roller means to prevent rolling movement thereof, said brake means including brake release means which may be actuated to permit rolling movement of said first roller means.

6. A track assembly as recited in claim 1 wherein said first and second roller means comprise a plurality of tapered rollers disposed at spaced locations around the interior of the band.

7. A track assembly as recited in claim 1 including gauge means adapted for positioning said band a predetermined distance from a plane that is normal to the axis of the pipe.

8. A track assembly as recited in claim 1 wherein said latch member includes a plurality of guide bars mounted adjacent the first and second serrated latch elements on the interior surface of the band, and each of said guide bars adjacent to said first latch member extends beyond the respective ends of said band.

9. An annular track assembly for supporting and positioning welding apparatus and the like for operation about the circumference of a cylindrical workpiece, comprising:

a substantially rigid band formed of a plurality of arcuate plate sections connected to one another by hinge means and having first and second ends;

first roller means mounted on said band for rolling engagement with the workpiece to provide axial movement of said band with respect to the pipe;

second roller means mounted on said band for rolling engagement with the workpiece to support said band a predetermined distance from the workpiece and provide for arcuate movement of said band with respect to the pipe; and a quick-release latch assembly for joining the ends of said band, and including:

a first serrated latch element pivotally mounted on said band proximate said first end;

a second serrated latch member pivotally mounted on said band proximate said second end for engaging said first latch member when said band is disposed around the workpiece;

means for moving at least one of said latch elements with respect to said band to secure said band about the workpiece;

means biasing said latch elements toward predetermined positions relative to said band for latching engagement when said band is disposed about the workpiece; and means for providing frictional engagement between said track assembly and the workpiece.

* * * * *